(No Model.)

J. C. BLUNDELL.
MACHINE FOR DYEING YARN.

No. 554,646. Patented Feb. 18, 1896.

FIG. 3.

WITNESSES.
Charles Hannigan
Daniel W. Fink

INVENTOR.
John C. Blundell
By Warren R. Pine
Atty.

(No Model.) 6 Sheets—Sheet 4.

J. C. BLUNDELL.
MACHINE FOR DYEING YARN.

No. 554,646. Patented Feb. 18, 1896.

WITNESSES.
Charles Hannigan
Daniel W. Fisk

INVENTOR.
John C. Blundell
by Warren R. Pine
Atty.

(No Model.) 6 Sheets—Sheet 6.

J. C. BLUNDELL.
MACHINE FOR DYEING YARN.

No. 554,646. Patented Feb. 18, 1896.

WITNESSES.

INVENTOR.
John C. Blundell
by Warren R. Pine
Atty.

United States Patent Office.

JOHN C. BLUNDELL, OF PROVIDENCE, RHODE ISLAND, ASSIGNOR TO THE GREENWOOD DYEING MACHINE COMPANY, OF MAINE.

MACHINE FOR DYEING YARN.

SPECIFICATION forming part of Letters Patent No. 554,646, dated February 18, 1896.

Application filed May 31, 1895. Serial No. 551,093. (No model.)

*To all whom it may concern:*

Be it known that I, JOHN C. BLUNDELL, of the city and county of Providence, in the State of Rhode Island, have invented a certain new and useful Improvement in Machines for Dyeing Yarn; and I declare the following to be a specification thereof, reference being had to the accompanying drawings.

Like numerals indicate like parts.

My invention is a device adapted for use in dyeing yarn; and it consists of the novel construction and combination of the several elements and parts hereinafter particularly described and set forth in the claims.

Figure 1:
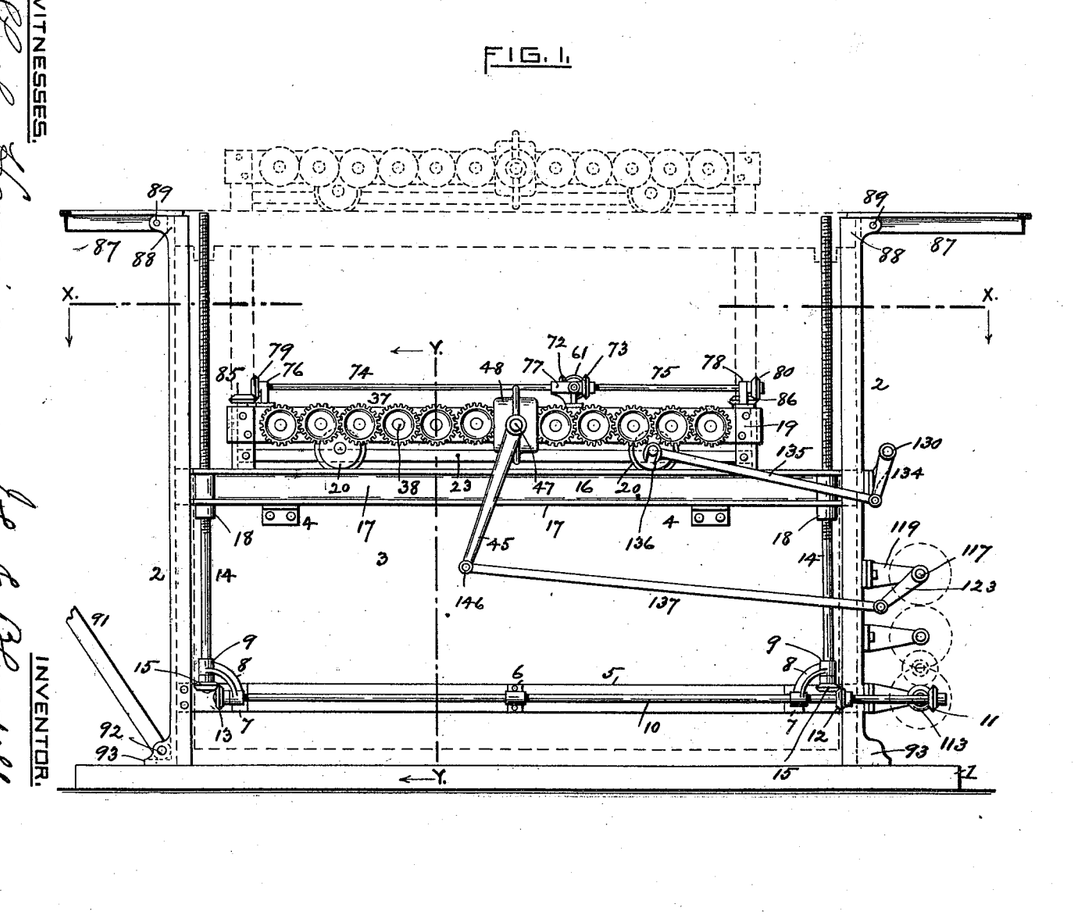
Figure 1 is a side elevation of my invention.
Figure 2:
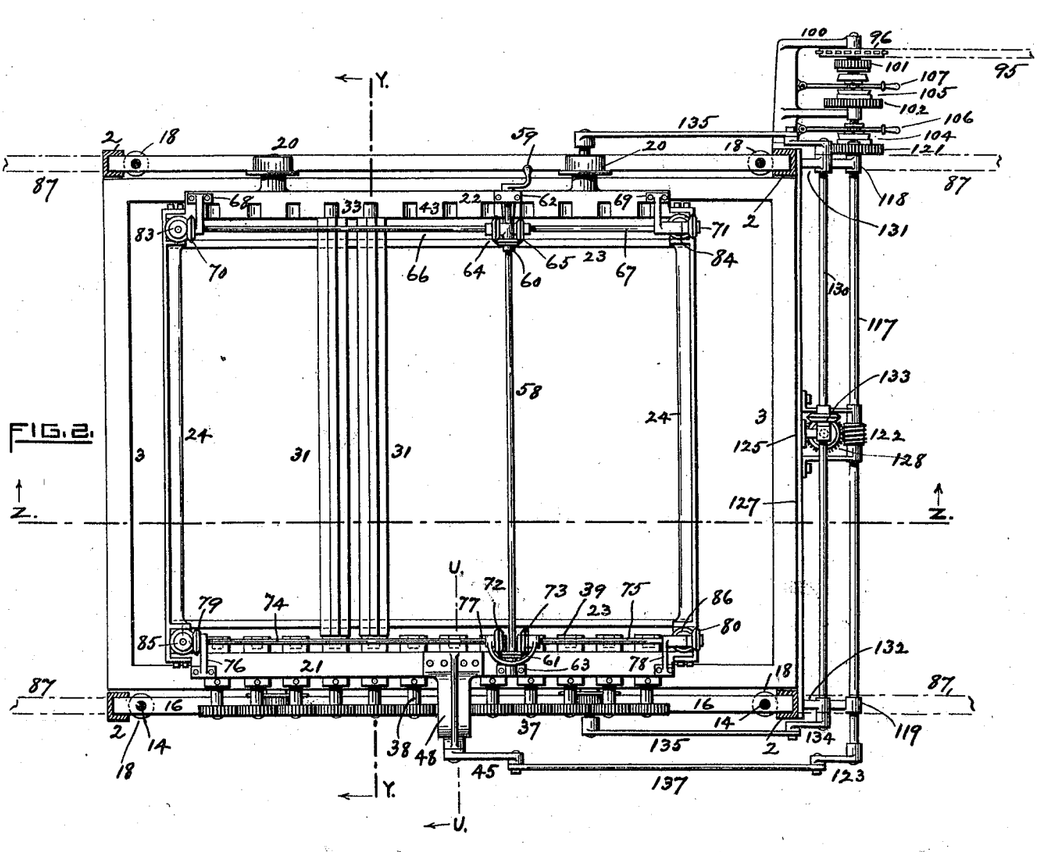
Fig. 2 is a top plan of the same, partly in section, on line X X of Fig. 1.

In the drawings, 1 represents the bed or platform of the machine, rectangular in form, upon which are erected four standards 2, preferably metallic, having longitudinal grooves and shaped in cross-section as shown in Fig. 2. A tank 3, preferably of wood, is placed upon the bed 1 and holds the dyeing liquor. Brackets 4 are fixed on opposite sides of the tank. On the same sides bars or rails 5 extend from one of the standards 2 to another near the bottom of the machine. Each bar 5 is bolted to the standards, as shown in Fig. 1, and is provided with a central bearing 6, and at its ends, respectively, with a bearing 7, which has an upwardly bent or curved arm or bracket 8, terminating with a bearing 9. In the bearings 7 7 a rod or shaft 10 is mounted, which is provided with small bevel-gears 11, 12 and 13. At each corner and placed vertically parallel with the standards 2, respectively, is a screw-threaded rod 14, mounted at its base in the bearing 9 of the bracket or arm 8, and having at its bottom end a bevel-gear 15, engaging with the bevel-gears 12 and 13, respectively, on the rod or shaft 10.

Rails 16, having flanges 17, are arranged to form a track. The rails 16 extend from end to end of the machine and enter loosely in the grooves of the standards 2, as illustrated in Figs. 1 and 2. Said rails 16 have near their ends, respectively, a tubular portion or support 18, whose bore is screw-threaded to engage with that one of the screw-threaded rods 14 on the same side therewith.

A traveling frame or carriage 19 runs on the rails 16 by trucks or wheels 20. Said carriage or frame 19 consists of two longitudinal bars 21 and 22, on which said trucks or wheels 20 are rotatably mounted, the longitudinal bars 23 23, the cross bars 24 and 25, and the downwardly-projecting slotted or grooved side bars 26 26, Fig. 4, the latter being preferably made of bronze or of a metal not liable to corrosion by the liquid dye. Sliding or movable bars 27 and 28 are mounted loosely in the grooves or slots of the side bars 26 26. The movable bar 27 has a series of equidistant L-shaped sockets or mortises 29, (see Fig. 3,) and the movable bar 28 has a series of similarly-arranged half-round sockets 30.

Figures 4, 5, 6, 7, 8, 9:
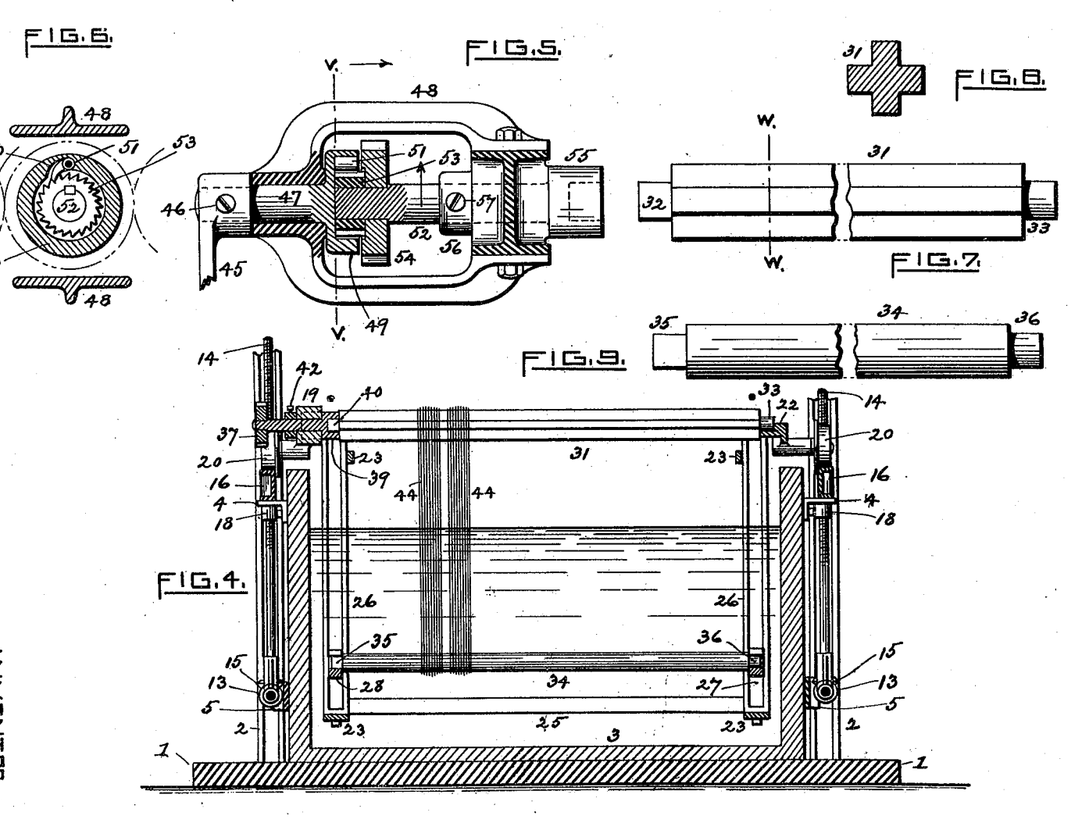
Fig. 4 is a view partly in elevation and partly in cross-section on line Y Y of Figs. 1 and 2.
Fig. 5 shows the ratchet driving mechanism, partly in elevation and partly in section, on line U U of Fig. 2.
Fig. 6 is a sectional view on line V V of Fig. 5.
Fig. 7 is a side elevation of the top yarn-stick.
Fig. 8 is a cross-section of the same on line W W of Fig. 7.
Fig. 9 is a side elevation of the lower yarn-stick.

In Figs. 7 and 8 is shown, respectively in side elevation and in cross-section, one of the top yarn-sticks, 31, having at one end a square or tenon-shaped extension 32, and at the other end a round or cylindrical extension 33.

The lower yarn-sticks, 34, are cylindrical, as shown in Fig. 9, and have a square or tenon-shaped extension 35 at one end and a cylindrical extension 36 at the other end. The square or tenoned ends 35 of the lower yarn-sticks, 34, are inserted in the L-shaped sockets 29 of the movable bar 27, as illustrated in Figs. 3 and 4, while the cylindrical ends 36 of the lower yarn-sticks, 34, are supported in the half-round sockets 30 of the movable bar 28, as shown in Fig. 4.

Cog-wheels 37, engaging with each other, are mounted in a train upon the longitudinal rail 21 and are fastened on the ends of shafts 38, which pass through said rail, and they turn with said shafts, respectively. The shafts 38 each have at the inner end a hub or head 39, having a central mortise or square socket 40. A collar, fastened to the shaft 38 by a set-screw 42, serves to hold said shaft in proper rotatable position in and through the said longitudinal rail.

The top yarn-sticks, 31, are mounted across the traveling frame or carriage by inserting their square or tenon-shaped ends 32 in the square mortises 40 of the hubs 39 of the shafts 38, respectively, while their cylindrical ends 33 rest in and are supported by the half-round sockets 43 of the longitudinal rail 22.

Figure 3:
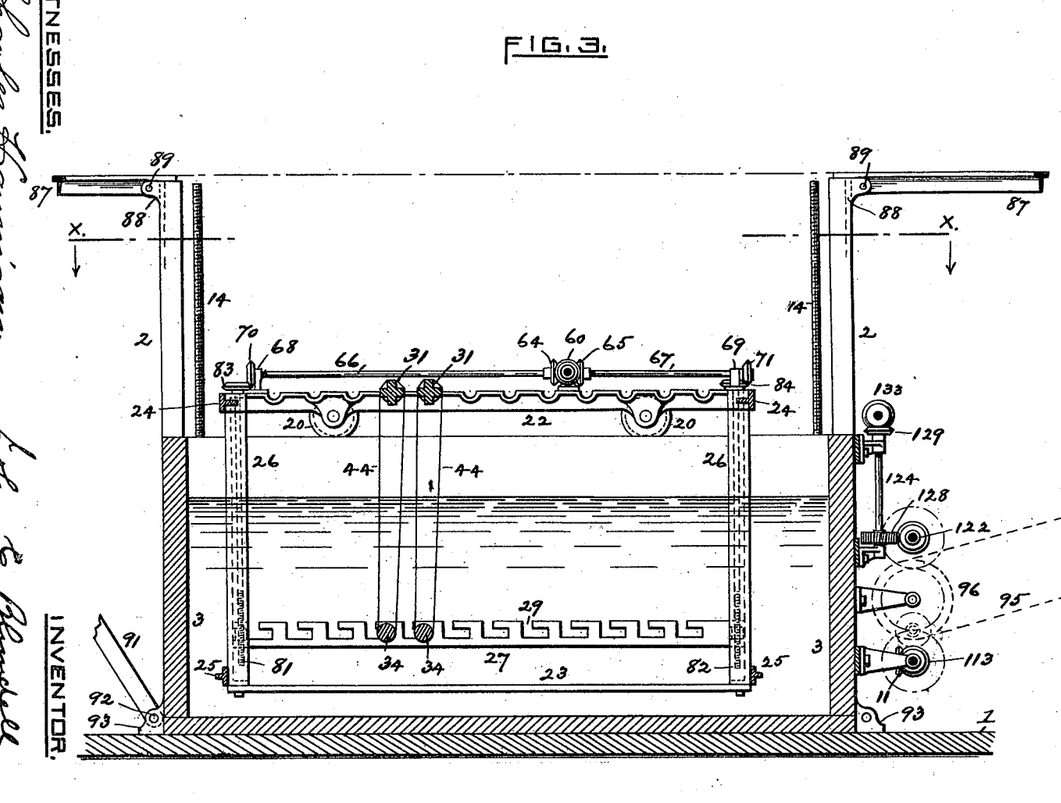
Fig. 3 is a view of my invention, partly in elevation and partly in section, on line Z Z of Fig. 2.

In Figs. 3 and 4 the skeins 44 of yarn are shown passing over the yarn-sticks 31 and 34, a portion of each skein being immersed in the dyeing liquor in the tank 3.

About midway in the train of cog-wheels 37 is a driving mechanism for said cog-wheels. (Shown in Figs. 1 and 2 and in enlarged detail view in Figs. 5 and 6.) A lever-arm 45 is fastened by a set-screw 46 upon a shaft 47. Said shaft 47 is mounted in a yoke or frame 48 and terminates at its inner end in a tubular head 49, having in its central bore or chamber a recess 50, in which a pawl 51 is pivotally mounted, as shown in Fig. 6. A shaft 52 abutting said shaft 47 is mounted in the rail 21 and has at one end a ratchet-wheel 53, splined or otherwise fastened thereto, and also a cog-wheel 54 fastened to it. The shaft 52 also has a mortised hub 55 and is held in proper rotatable position by the collar 56 and the set-screw 57. The cog-wheel 54 of said driving mechanism is in gear with the adjacent cog-wheels 37 of the train.

A yarn-tension device is provided, consisting of a rod 58, which can be turned by a hand-crank 59, and which extends from one longitudinal rail of the carriage to the other. Said rod 58 has two bevel-gears 60 and 61 and is mounted in suitable bearings 62 and 63. Bevel-gears 64 and 65, mounted on rods 66 and 67, respectively, engage with the bevel-gear 60 of the rod 58. Said rods 66 and 67 are mounted in bearings 68 and 69. The rod 66 has a bevel-gear 70 at its end, and the rod 67 has a bevel-gear 71 at its end. Bevel-gears 72 and 73, mounted on rods 74 and 75, respectively, engage with the bevel-gear 61 of the rod 58. Said rods 74 and 75 are mounted in bearings 76, 77, and 78, respectively. The rods 74 and 75, respectively, have at their outer ends the bevel-gears 79 and 80.

In the side bars 26 26, at both ends of each, respectively, are mounted rods 81 and 82, respectively, (see Fig. 3,) the lower portion of each of which is screw-threaded, and said rods 81 81 82 82 have at the top thereof bevel-gears 83, 84, 85, and 86, respectively, which engage with the bevel-gears 70, 71, 79, and 80 at the outer ends of the rods 66, 67, 74, and 75, respectively. The screw-threaded portion of the rods 81 81 82 82 engage with screw-threaded bores at the ends of the movable bars 27 28. (See Fig. 3.)

An extension-track 87 is pivotally connected to each standard 2 at the top thereof by means of an earpiece 88 extending from the standard and by a pin 89 passing through said earpiece 88 and track 87. The track 87 also has a fixed transverse pin 90 at its outer end. A brace-rod 91 is pivotally connected at its bottom by a pin 92 to an earpiece 93 projecting from the standard 2, and has at its upper end a hook 94, engageable with the pin 90 of the track 87.

Figures 10, 11:
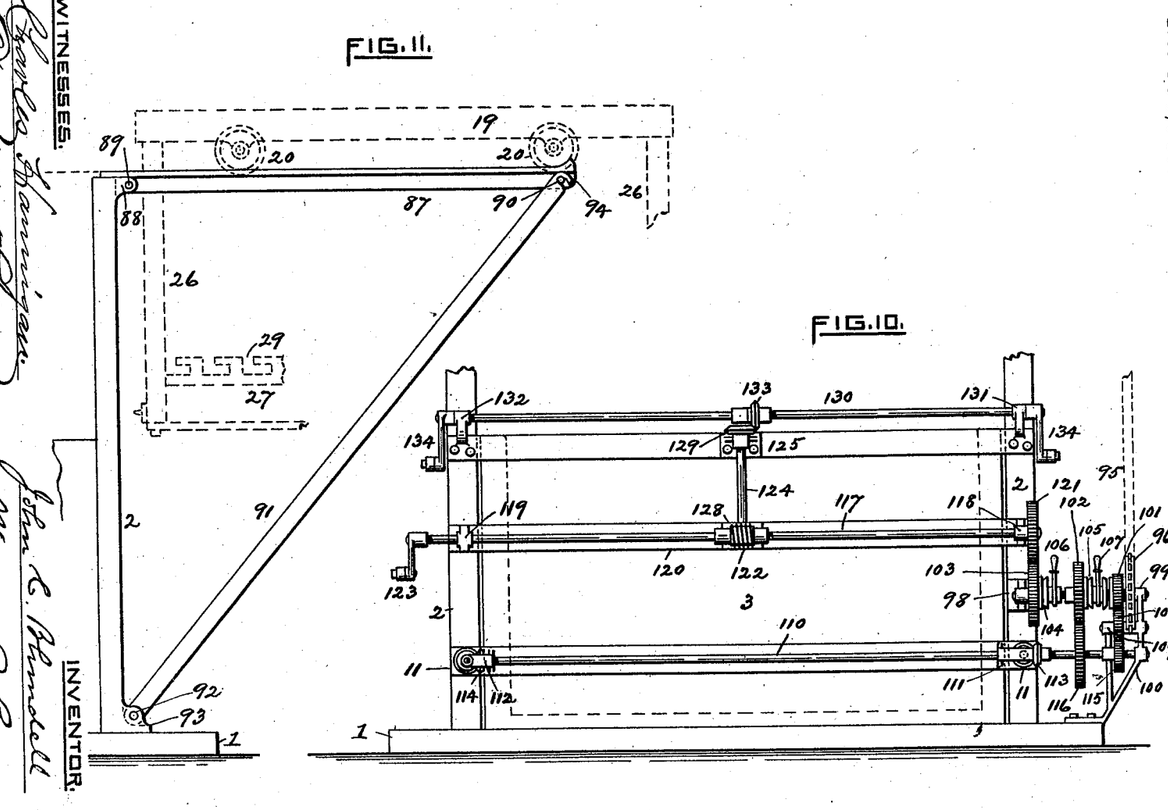
Fig. 10 is a rear end elevation of my said improved machine.
Fig. 11 shows in elevation the extension-railway on which the carriage travels.

The machine is operated by power applied by a chain-belt 95 to a sprocket-wheel 96, which is mounted on a shaft journaled in the bearing 98 upon the standard 2, as seen in Fig. 10, and in a bearing 99 of a bracket 100. On said shaft 97 are also mounted the gears 101, 102 and 103, and the friction-clutches 104 and 105, movable by the shipping-handles 106 and 107, respectively. An intermediate or idle gear is shown at 108 mounted on its shaft 109 and engageable with the gear 101 of the shaft 97. A shaft 110 is mounted on said bracket 100 and in the bearings 111 and 112, and has the bevel-gears 113 and 114 and the gears 115 and 116, the gear 115 being engageable with the idler 108, and the gear 116 being engageable with the gear 102. A shaft 117 mounted in bearings 118 and 119 upon a cross-piece 120, fastened to the standards 2, has a gear 121 engageable with the gear 103, a central worm-gear 122, and a crank 123. A shaft 124, mounted in bearings 125 and 126 upon the cross-piece 120 and the cross-piece 127, has a gear 128 engageable at its bottom with the worm 122, and also has a bevel-gear 129 at its top. A shaft 130, mounted in bearings 131 and 132 upon said cross-piece 127, has a central bevel-gear 133 engageable with the bevel-gear 129, and has cranks 134 at its ends.

From the cranks 134 there extends on each side of the machine an arm or link-bar 135, pivotally connected to the crank and terminating in a hook 136, which engages with the axle of one pair of the truck-wheels 20.

From the crank 123 there extends an arm or link-bar 137, pivotally connected to the crank 123 at one end and to the end of the lever-arm 45 at the other, as shown at 146.

Figures 12, 13, 14, 15:
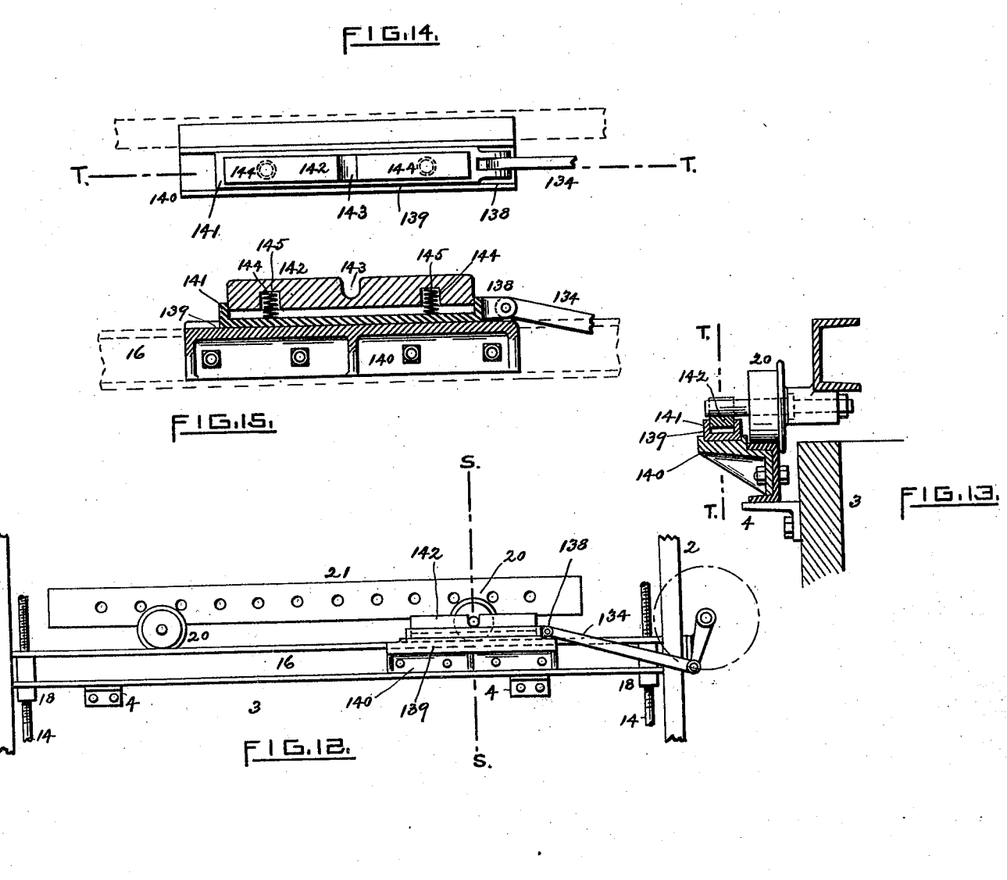
Fig. 12 shows in elevation mechanism to give reciprocating movement to the carriage.
Fig. 13 is a cross-section on line S S of Fig. 12.
Fig. 14 is a top plan of said reciprocating mechanism.
Fig. 15 is a view on section-line T T of Figs. 13 and 14.

Instead of connecting the arm or link-bar 134 with the axle of the truck-wheels 20 directly by means of a hook 136, I may use the device shown in Figs. 12, 13, 14 and 15, where said arm or link-bar is pivotally connected to an earpiece 138 of a sliding piece 139, which is capable of sliding back and forth on a bracket 140. Said slide 139 has flanges 141, and within said flanges is a rest or block 142, having a central socket 143. Said block 142 is slotted on its under surface, as seen at 144, and spiral springs 145, inserted in the slots 144, have a bearing on the slide 139 and serve to keep said block in an elevated position. The said socket 143 of the block-rest 142 is adapted to receive the end of the axle of the truck-wheels 20, as seen in Fig. 12.

Having thus described the several parts of my invention, I will now explain its operation. The tank 3 is filled with the desired dyeing liquid. The traveling frame or carriage is in the elevated position upon the extension-track 87 at one side of the machine, as indicated in dotted lines in Fig. 11, said extension-tracks being supported by braces 91, as there shown. The yarn to be dyed is in skeins 44, and is placed upon the yarn-sticks 31 and 34, as shown in Figs. 3 and 4. By reason of the square ends of said sticks and their engagement in the square mortises 40 and 29, respectively, the yarn can be turned whenever the top yarn-sticks, 31, are rotated by the cog-wheels 37 connected therewith; but the lower yarn-sticks are not rotatable, and the yarn passes frictionally over them. When the yarn has been properly placed on the yarn-sticks and is ready to be colored, the carriage or traveling frame is run along the extension-tracks 87 to the elevated position shown in dotted lines in Fig. 1, directly over the tank 3. The arm or link-bar 137 from the crank 123 is then connected with the lever-arm 45. The carriage or traveling-frame is now lowered to bring the lower portions of the skeins 44 into the tank and liquor. This is done by the driving mechanism. The power is applied by the belt 95 to the sprocket-wheel 96 and to the gears 101, 108, and 115, now in clutch, and by the engagement of the several bevel-gears 11, 12, 13, 15, 113, and 114 the screw-threaded rods 14 14 14 14 are turned, which, by their engagement with the tubular screw-threaded supports 18 18 18 18 of the rails 16 16, cause said frame or carriage gradually to descend to the position shown in solid lines in Fig. 1, in which position the rails 16 16 are further supported by the brackets 4 4 4 4. The gear 101 is then thrown out of clutch, so that the rods 14 no longer turn. The gears 101, 102, and 103 are loose on the shaft 98, but may be secured thereto by the friction-clutches, operated by the shipping-handles, as desired. If the rods 14 are to be turned in one direction, the gear 101 is made fast to the shaft 98, whereupon the gear 101 meshes with the idler 108 and that with the gear 115; but if the rods 14 are to be turned in the opposite direction the gear 101 is loose upon the shaft 98 and the gear 102 is made fast thereto, whereupon the gear 102 meshes with the gear 116. So, too, the gear 121 is rotated whenever the gear 103, meshing therewith, is made fast to the shaft 98 by the friction-clutch 104; but when said gear 103 is loose on the shaft the gear 121 does not revolve. The traveling frame or carriage is given a back-and-forth motion by means of the cranks 134 of the shaft 130, which, by its worm-gear connection with the shaft 117, is accurately timed to move with the shaft 117. These cranks 134 by the link-bars 135 cause said frame to have a limited reciprocating motion and it travels upon the wheels or trucks 20 upon the rails 16. At the same time the crank 123 of the shaft 117 oscillates the lever 45 by means of the link-bar 137, and this reciprocating motion of the lever-arm 45 causes the pawl 51 to engage the ratchet-wheel 53 of the shaft 52 intermittently and by degrees to turn said shaft and its attached cog-wheel 54. The cog-wheel 54 being engaged with the adjacent cog-wheels 37 of the train imparts to them a corresponding intermittent rotation, the cog-wheels 37, of course, moving each in a direction opposite to the movement of the adjacent cog-wheel in the series on either side. It is not necessary, however, that the reciprocating movement of the carriage and the intermittent rotation of the cog-wheels 37 should go on at the same time. They may, if desired, be wholly independent of each other and either one used and the other omitted by disconnecting the link-bars 135 or 137, as the case may be, from their respective attachments.

When the device shown in Figs. 12, 13, 14, and 15 is used, the movement of the slide 139 by the link-bar 134 will bring the slot 143 under the axle of the trucks 20 of the carriage, whereupon the springs 145 will force the block or rest 142 upward, so that the end of the axle will engage with said slot, as shown in Fig. 12.

The yarn is tightened or brought to a proper tension upon the yarn-sticks 31 and 34 when necessary by turning the hand-crank 59. This movement being communicated by the rods 58 66 67 74 75 81 81 81 81 and the respective bevel-gears thereon results in carrying the movable bars 27 28 farther up or down in the grooved and slotted bars 26 26, thus loosening or tightening the yarn upon the yarn-sticks.

The yarn-skeins are not drawn tightly on the yarn-sticks, but preferably are drawn only enough to obtain a sufficient friction of the yarn upon the yarn-sticks, so that the intermittent turning of the top yarn-sticks, as above described, will move the skeins thereon to feed them intermittently to the dyeing liquor.

By these several operations the yarn is uniformly dyed and other important purposes served.

It will be observed that the yarn is given the intermittent feed motion before it enters the dyeing liquor. The result is that all parts of the skein are equally subjected to the immersion, and no one portion receives more coloring-matter, as said feeding motion is regular and uniform and continues until the yarn is removed from the tank. Moreover, this same uniformity of the intermittent feed motion gives all parts of the yarn an equal length of air exposure for drying and for the oxidation of the dye-stuff thereon. In this manner absolute uniformity of result is obtained.

The movement of the skeins of yarn in directions each opposite to that of its neighboring skein prevents the yarn of the different skeins from entangling and tends to keep each skein clear from all others.

All the time the yarn-skeins are intermittently fed by the cog-wheels and ratchet, as aforesaid, the carriage moves back and forth, carrying the skeins to and fro in the tank and liquor, thus imitating the hand motion used by dyers in coloring yarns by hand processes and for the same purpose.

When the yarn has been subjected for a sufficiently long time to the liquor, the carriage is lifted up out of the tank by means of the lifting mechanism already described, the movement of which is reversed. When the carriage has been elevated in this manner to the position shown in dotted lines in Fig. 1, it can then be run out on the extension-track, Fig. 11, away from the steam and vapors of the dye-stuffs in the tank, and the yarn is then removed from the yarn-sticks.

The hook connection (shown at 136 in Fig. 1) between the link-bar 135 and the axle of the truck 20 permits the ready detachment of the carriage from the driving mechanism to allow said carriage to be lifted out of the tank; but when the slotted block and slide are used the carriage can be lifted off directly, and when lowered again into its former position the device will automatically engage the link-bar and carriage.

As is evident from Fig. 2, the tank 3 can be withdrawn from the platform or bed 1 of the machine at one end without interfering with the mechanism, and another tank can be substituted therefor whenever desired.

The operative parts of the device are supported independently of the tank 3, and therefore the tank is not liable to be sprung out of shape or affected by contraction or expansion, as it would be if it were itself made to sustain the weight of said operative parts.

The dyeing liquor can be kept continually at the boiling-point, as both the turning movement of the top yarn-sticks and the reciprocating movement of the frame which supports the yarn-sticks are accomplished automatically. Hence it is not necessary to turn off the steam, as it would be if the yarn-sticks were turned by hand or the yarn moved to and fro in the liquor by hand, as heretofore.

My improved machine for dyeing yarn can be easily operated by one man without assistance, and can be loaded with yarn and unloaded in easy reach from the floor while the frame or carriage is upon the extension-tracks and out at one side of the tank, and so the workman is not exposed to the heat and fumes of the dye-stuffs. I have provided extension-tracks on both ends of the machine, as seen in Figs. 1, 2, and 3, and so two carriages may be used, and one loaded or unloaded while the other is in use in the tank.

When the extension-tracks are not needed, they may be detached from the hook connection with the brace-rods at the ends thereof. The said tracks and braces may then be folded up to lie in snug contact vertically with the standards.

I prefer to use twelve upper and twelve lower yarn-sticks, and these are capable of carrying one hundred pounds of yarn; but any other number of said yarn-sticks may be used, as desired.

Another advantage is that the dyeing liquor may be strengthened or "stuffed" while the yarn is entirely free from the tank and raised therefrom by the devices described, and the frame can be thereafter lowered again into the former position. Thus the danger of streaking the yarn, experienced in the hand process, whenever the strength of the liquor is increased, is entirely avoided in my device.

I claim as a novel and useful invention and desire to secure by Letters Patent—

1. In a yarn-dyeing machine, the combination of a tank, a frame supported over said tank, yarn-sticks rotatably mounted in said frame and having on their ends, respectively, cog-wheels, engageable with each other, a ratchet-wheel connected with one of said cog-wheels and a traveling pawl adapted to operate said ratchet-wheel intermittently, substantially as set forth.

2. In a yarn-dyeing machine, the combination of a tank, a frame supported over said tank, yarn-sticks rotatably mounted in said frame and having at their ends, respectively, cog-wheels, engageable with each other, a ratchet-wheel connected with one of said cog-wheels, an oscillating feeding device pivotally mounted on said frame and a pawl thereon, adapted to intermittently turn said ratchet-wheel, a crank and shaft driven by power, and a connection between said crank and oscillating feeding device, substantially as described.

3. In a yarn-dyeing machine, the combination of a tank, a frame supported over said tank, yarn-sticks rotatably mounted in said frame and having at their ends, respectively, cog-wheels, engageable with each other, a ratchet-wheel connected with one of said cog-wheels, a yoke secured to said frame, a shaft mounted in the yoke and having at its inner end a head or hub, whereon a pawl is mounted so as to operate said ratchet-wheel, a lever-arm connected with said shaft, a crank and shaft driven by power, and a link-bar connecting said lever-arm and crank, substantially as specified.

4. In a yarn-dyeing machine, the combination with a tank, of a frame having two longitudinal bars, supported over said tank, yarn-sticks each having at one end a square or tenon-shaped extension and at the other end a cylindrical extension, the latter being mounted upon one of said bars in half-round sockets thereof, a train of engaging cog-wheels, mounted in the other of said longitudinal bars, each cog-wheel having a shaft provided with a head or hub made with a square mortise or socket in which the square or tenon-shaped end of a yarn-stick is held, substantially as described.

5. The combination of a frame, consisting of two upper and two lower longitudinal bars, cross-bars at top and bottom connecting said upper and lower longitudinal bars, respectively, and vertical bars at each corner of said frame, top yarn-sticks, each having at one end a square or tenon-shaped extension and at the other end a cylindrical extension, the latter supported in half-round sockets on the top of one of said upper longitudinal bars, a train of engageable cog-wheels, each mounted in the other of said upper longitudinal bars upon a shaft, which is provided with a head having a square mortise adapted to receive the square end of one of said top yarn-sticks, respectively, lower yarn-sticks each having at one end a square or tenon-shaped extension and at the other end a cylindrical extension, the latter supported in half-round sockets upon one of said lower longitudinal bars and the square or tenon-shaped end of which being secured in L-shaped mortises in the other of said lower longitudinal bars, substantially as shown.

6. The combination of a frame, consisting of two fixed upper and two fixed lower longitudinal bars, cross-bars at top and bottom connecting said upper and lower fixed longitudinal bars, respectively and vertical grooved or slotted bars at each corner of said frame, two movable longitudinal bars mounted in the grooves or slots of said vertical corner bars, one of which movable bars has a series of half-round sockets upon its upper surface and the other of which has a series of L-shaped mortises, and lower yarn-sticks, each having at one end a square or tenon-shaped extension and at the other end a cylindrical extension, a train of wheels movable together and mounted in one of the upper fixed longitudinal bars upon shafts, each of which terminates inwardly in a head having a square mortise, adapted to receive the square end of a top yarn-stick, while the cylindrical end of said top yarn-stick is supported in a half-round socket upon the top of the other of said upper fixed longitudinal bars, said lower yarn-sticks being secured at their square ends in said L-shaped mortises of the movable longitudinal bar and supported at their round ends in the half-round sockets of the other of said movable longitudinal bars and means for increasing or diminishing the distance of said movable longitudinal bars from the upper fixed longitudinal bars, for the purpose of regulating the tension of a skein or skeins of yarn upon said yarn-sticks, substantially as specified.

7. In a yarn-dyeing machine, the combination of a frame consisting of two fixed upper and two fixed lower longitudinal bars, cross-bars at top and bottom connecting said upper and lower fixed longitudinal bars, respectively, and vertically grooved and slotted bars at each corner of said frame, two movable longitudinal bars mounted in the grooves or slots of said vertical corner bars one of which movable bars has a series of half-round sockets upon its upper surface and the other of which has a series of L-shaped mortises, top and lower yarn-sticks, each having at one end a square or tenon-shaped extension and at the other end a cylindrical extension, a train of wheels movable together and mounted in one of the upper fixed longitudinal bars upon shafts, each of which terminates in a head having a square mortise adapted to receive the square end of a top yarn-stick, while the cylindrical end of said top yarn-stick is supported in a half-round socket upon the top of the other of said upper fixed longitudinal bars, said lower yarn-sticks being secured at their square ends in said L-shaped mortises of one of the movable longitudinal bars and supported at their round ends in the half-round sockets of the other of said movable longitudinal bars, a rotatable shaft having bevel-gears, shafts arranged upon said upper fixed longitudinal bars and having bevel-gears engageable with said first-mentioned bevel-gears, and vertical screw-threaded rods mounted in said upper fixed longitudinal bars and said movable longitudinal bars, respectively, each of the latter having screw-threaded bores at their ends to engage said vertical shafts, and bevel-gears on said vertical shafts to engage the bevel-gears of said longitudinal shafts, substantially as shown.

8. In a yarn-dyeing machine, the combination of a frame, top yarn-sticks rotatably mounted in said frame, movable bars held in slotted or grooved supports beneath said frame and mechanism to move said bars nearer to or farther from the frame, substantially as and for the purpose specified.

9. In a yarn-dyeing machine, the combination of a tank, a frame movable on supports over said tank, wheels mounted upon shafts in said frame, top yarn-sticks connected with said shafts to turn therewith, lower yarn-sticks supported beneath said frame and parallel with the top yarn-sticks, respectively, two shafts driven by power, each having a crank, a ratchet upon one of said wheels, and a pawl engaging with said ratchet, connecting means from one of said cranks to said movable frame adapted to reciprocate the same and connecting means from the other of said cranks adapted to impart motion to said pawl, substantially as described.

10. In a yarn-dyeing machine, a bed or platform having grooved standards at its corners, a railway whose ends enter the grooves of said standards and are provided with screw-threaded tubes, screw-threaded vertical rods properly mounted at their lower ends and engageable with said screw-threaded tubes, a frame supported on said railway and provided with yarn-sticks and means to rotate said vertical rods, for the purpose of elevating or lowering said railway and frame, substantially as and for the purpose specified.

11. In a yarn-dyeing machine, a bed or platform having grooved standards at its corners, a railway whose ends enter the grooves of said standards and are provided with screw-threaded tubes, screw-threaded vertical rods properly mounted at their lower ends and engageable with said screw-threaded tubes, bevel-gears upon said vertical rods, a frame supported on said railway and provided with yarn-sticks and a shaft driven by power and having bevel-gears engageable with the bevel-gears first mentioned, substantially as shown.

JOHN C. BLUNDELL.

Witnesses:
WARREN R. PERCE,
DANIEL W. FINK.